(12) United States Patent
Sung et al.

(10) Patent No.: US 8,911,097 B2
(45) Date of Patent: Dec. 16, 2014

(54) DISPLAY DEVICE

(71) Applicant: AU Optronics Corp., Hsin-Chu (TW)

(72) Inventors: Wen-Ching Sung, Hsin-Chu (TW);
Chien-Wei Chen, Hsin-Chu (TW);
Cheng-Hsing Lin, Hsin-Chu (TW);
Yu-Ying Tang, Hsin-Chu (TW);
Wei-Hung Kuo, Hsin-Chu (TW);
Shih-Po Chou, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 35 days.

(21) Appl. No.: 13/894,433

(22) Filed: May 15, 2013

(65) Prior Publication Data

US 2014/0133046 A1    May 15, 2014

(30) Foreign Application Priority Data

Nov. 9, 2012  (TW) .............................. 101141705 A

(51) Int. Cl.
  *G02B 27/00*   (2006.01)
  *G02F 1/1335*  (2006.01)
  *G09F 13/00*   (2006.01)
(52) U.S. Cl.
  CPC .............. *G02F 1/1335* (2013.01); *G09F 13/00* (2013.01)
  USPC ......................................................... 359/609
(58) Field of Classification Search
  USPC ........................................ 359/601, 609, 614
  See application file for complete search history.

(56) References Cited

U.S. PATENT DOCUMENTS

2010/0259828 A1   10/2010  Byeon
2013/0114240 A1*   5/2013  Makita et al. .............. 362/23.19

FOREIGN PATENT DOCUMENTS

CN           102388333 A        3/2012

* cited by examiner

*Primary Examiner* — Joseph P Martinez
(74) *Attorney, Agent, or Firm* — Winston Hsu; Scott Margo

(57) ABSTRACT

A display device includes a substrate, a light shielding layer, at least one fading pattern and a display module. The display module is disposed on the substrate and has a display area. The light shielding layer is disposed on a periphery of the substrate and has a first side and a second side, wherein the first side is opposite to the second side. The at least one fading pattern is disposed on the substrate, is adjacent to at least one side of the first side and the second side of the light shielding layer, and does not overlap the display area of the display module. Each fading pattern includes N light transmissible areas, the N light transmissible areas are adjacent to each other, and transmittances of the N light transmissible areas are different from each other, wherein N is a positive integer larger than one.

11 Claims, 10 Drawing Sheets

DISPLAY DEVICE

BACKGROUND OF THE INVENTION

1. Field of the Invention

The invention relates to a display device and, more particularly, to a display device having fading pattern(s) adjacent to at least one side of two opposite sides of a light shielding layer.

2. Description of the Prior Art

Referring to FIG. 1, FIG. 1 is a schematic front view illustrating a display device 1 of the prior art. As shown in FIG. 1, to prevent light from leaking out from a periphery of the display device 1 and to hide some components disposed at a frame of the display device 1, a light shielding layer 12 (i.e. well-known black matrix, BM) is formed on the periphery of a display area 10 over a glass substrate of the display device 1. However, when the display device 1 is switched off, a boundary between the light shielding layer 12 and the display area 10 is obvious due to color contrast between the light shielding layer 12 and the display area 10. Accordingly, the display device 1 cannot show a full black visual effect. Furthermore, the display device 1 is always cut and grinded during manufacture such that the outside of the light shielding layer 12 may be damaged to peel easily. In this case, a new light shielding layer will be added to the outside of the original light shielding layer. A user will see an obvious boundary due to color difference between the new and original light shielding layers such that the visual effect is influenced.

SUMMARY OF THE INVENTION

Therefore, an objective of the invention is to provide a display device having fading pattern (s) adjacent to at least one side of two opposite sides of a light shielding layer, so as to solve the aforesaid problems.

According to an embodiment of the invention, a display device comprises a substrate, a display module, a light shielding layer and at least one fading pattern. The display module is disposed on the substrate and has a display area. The light shielding layer is disposed on a periphery of the substrate and has a first side and a second side, wherein the first side is opposite to the second side. The at least one fading pattern is disposed on the substrate, is adjacent to at least one side of the first side and the second side of the light shielding layer, and does not overlap the display area of the display module. Each fading pattern comprises N light transmissible areas, the N light transmissible areas are adjacent to each other, and transmittances of the N light transmissible areas are different from each other, wherein N is a positive integer larger than one.

As mentioned in the above, the invention disposes the fading pattern at at least one side of opposite sides of the light shielding layer and the fading pattern comprises at least two light transmissible areas with different transmittances. Through the variation of different transmittances, the color in a direction from the light shielding layer to the fading pattern will vary gradually so as to eliminate the obvious boundary between the light shielding layer and the display area and/or eliminate the obvious boundary between the new and original light shielding layers mentioned in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
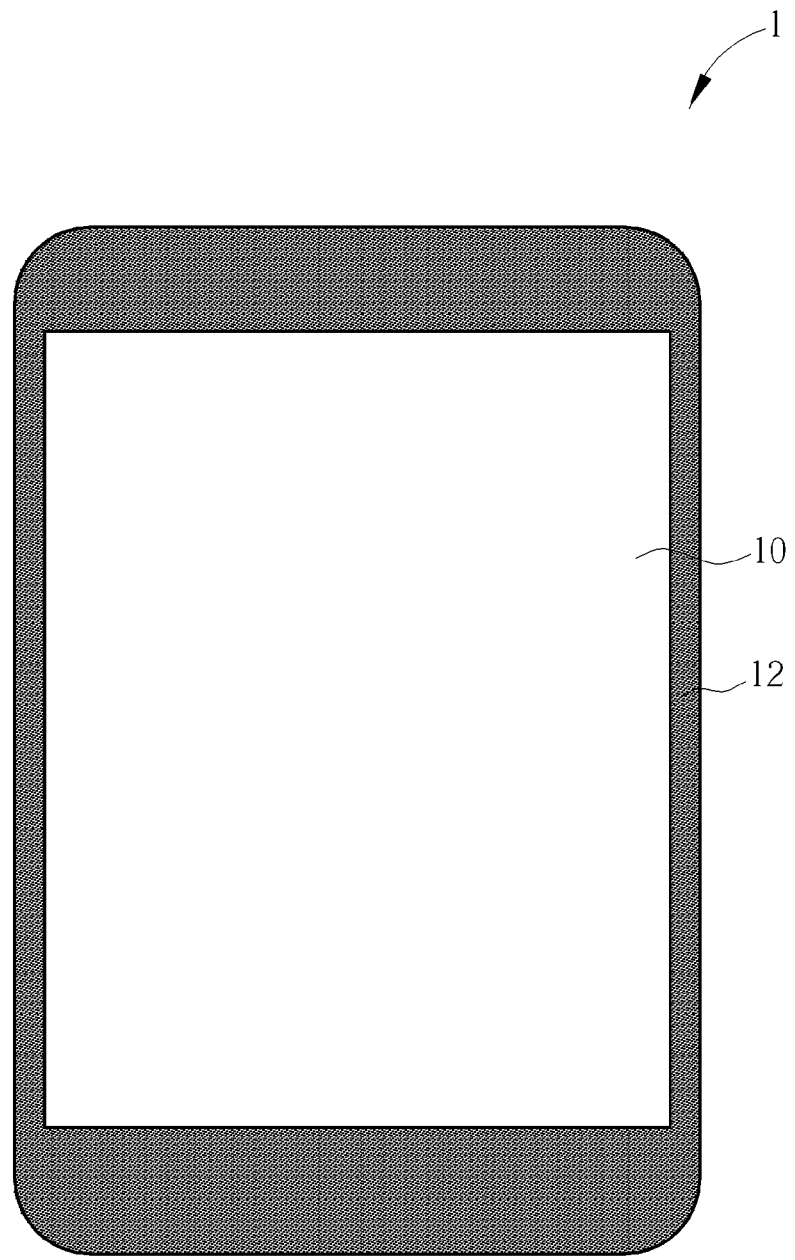
FIG. 1 is a schematic front view illustrating a display device of the prior art.
Figure 2:
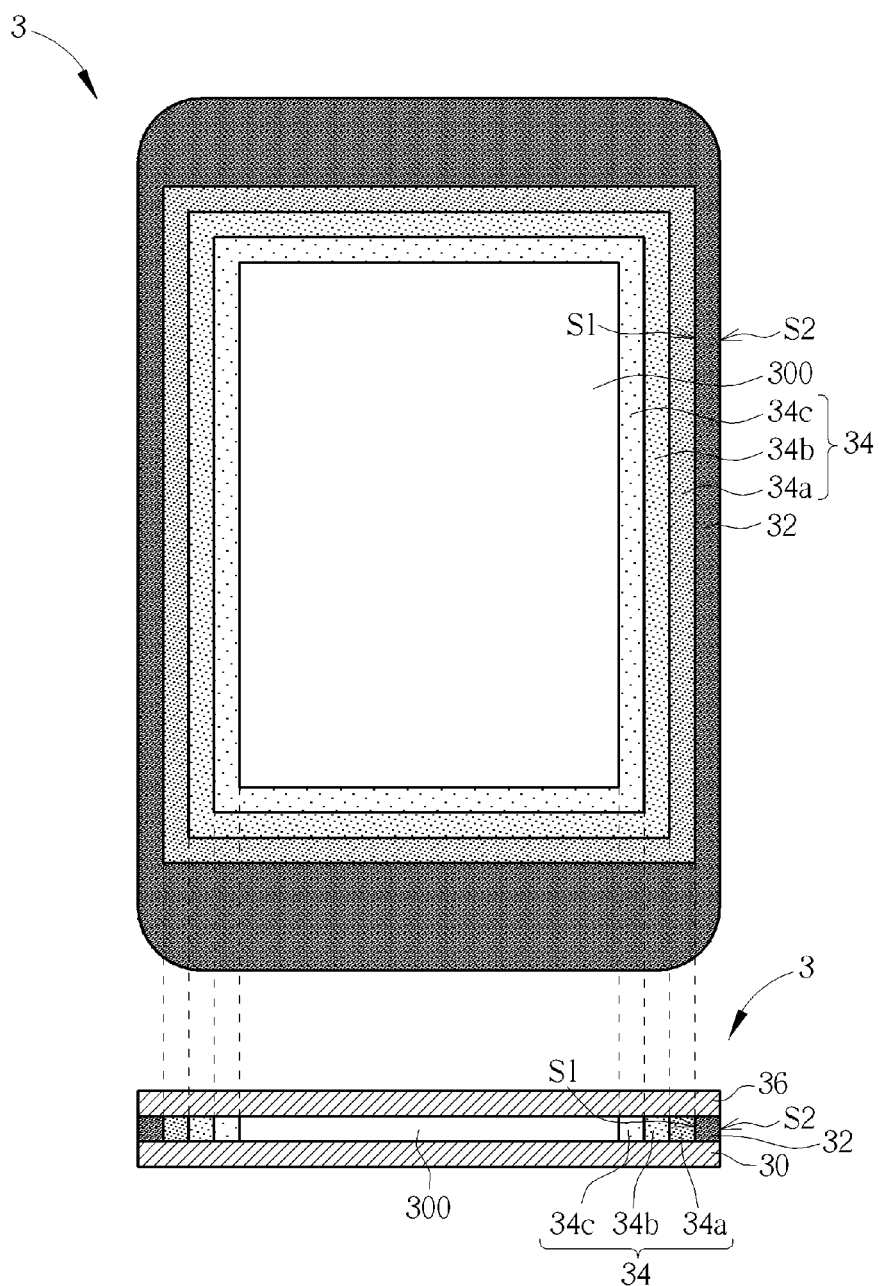
FIG. 2 is a schematic front and cross-sectional view illustrating a display device according to an embodiment of the invention.

Referring to FIG. 2, FIG. 2 is a schematic front and cross-sectional view illustrating a display device 3 according to an embodiment of the invention. As shown in FIG. 2, the display device 3 comprises a substrate 30, a light shielding layer 32, a fading pattern 34 and a display module 36. The light shielding layer 32 is disposed on the substrate 30 and has a first side S1 and a second side S2, wherein the first side S1 is opposite to the second side S2. In general, the substrate 30 has a display area 300 and the light shielding layer 32 is disposed on a periphery of the substrate 30, surrounding the display area 300, for example. Therefore, the first side S1 represents the inside of the light shielding layer 32 relative to the display area 300 and does not overlap the display area 300, and the second side S2 represents the outside of the light shielding layer 32 relative to the display area 300. In other words, the first side S1 of the light shielding layer 32 is close to the display area 300 and the second side S2 of the light shielding layer 32 is far away from the display area 300 correspondingly.

The fading pattern 34 is disposed on the substrate 30. In this embodiment, the fading pattern 34 is located at the first side S1 of the light shielding layer 32 and adjacent to the light shielding layer 32. In other words, the fading pattern 34 is located between the light shielding layer 32 and the display area 300. The fading pattern 34 comprises N light transmissible areas, wherein N is a positive integer larger than one. In this embodiment, the fading pattern 34 comprises three light transmissible areas 34a, 34b, 34c. However, in another embodiment, the fading pattern 34 may comprise two or more than three light transmissible areas. The number of the light transmissible areas can be determined according to practical applications and are not limited to three. The three light transmissible areas 34a, 34b, 34c are adjacent to each other and transmittances of the three light transmissible areas 34a, 34b, 34c are different from each other. The display module 36 is disposed on the substrate 30.

In practical applications, the display module 36 may be a liquid crystal display module, a plasma display module, an organic light-emitting diode (OLED) display module or other display modules; the substrate 30 may be a glass substrate or other substrates, such as a protective glass of the display device 3; the light shielding layer 32 may be chromium (Cr), chromium oxide, black matrix or other light shielding materials.

It should be noted that the display device 3 is also equipped with necessary software and hardware, such as a central processing unit (CPU), a memory, a storage device, a power supply, an operating system (OS), and so on, based on practical applications except the components shown in FIG. 2. The principles of the aforesaid components are well known by one skilled in the art, so those will not be depicted herein.

Since the transmittances of the light transmissible areas 34a, 34b, 34c are different from each other, the color in a direction from the light shielding layer 32 to the fading pattern 34 will vary gradually. For example, the transmittances of the light transmissible areas 34a, 34b, 34c may increase in a direction away from the light shielding layer 32 (i.e. increase in the direction from the light shielding layer 32 to the display area 300) such that the color between the light shielding layer 32 and the display area 300 generates fading variation, so as to reduce color difference between the light shielding layer 32 and the display area 300. Accordingly, when the display device 3 is switched off, a boundary between the light shielding layer 32 and the display area 300 becomes non-obvious through the color variation of the light transmissible areas 34a, 34b, 34c such that the appearance of the display device 3 will be more fashionable and beautiful. In other words, the invention utilizes the variation of the transmittances of the light transmissible areas 34a, 34b, 34c to eliminate the obvious boundary between the light shielding layer 32 and the display area 300.

It should be noted that the transmittances of the light transmissible areas 34a, 34b, 34c may also decrease in the direction away from the light shielding layer 32 or may vary irregularly so as to generate other color variation between the light shielding layer 32 and the display area 300 for visual effect.

Figure 3:
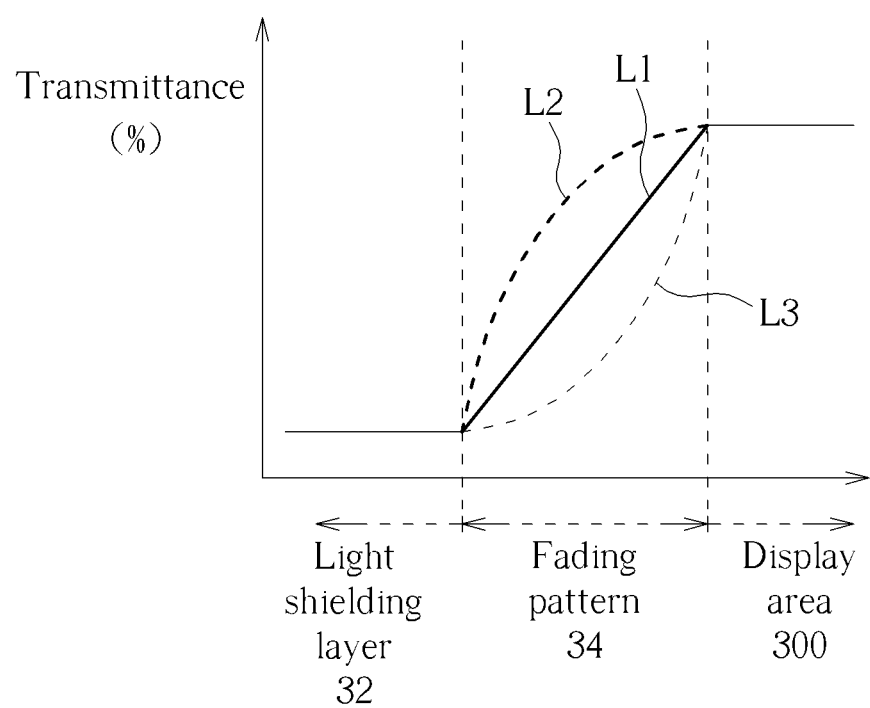
FIG. 3 is a schematic diagram illustrating the variation of the transmittances of the light shielding layer, the fading pattern and the display area.

Referring to FIG. 3, FIG. 3 is a schematic diagram illustrating the variation of the transmittances of the light shielding layer 32, the fading pattern 34 and the display area 300. As shown in FIG. 3, the transmittances of the fading pattern 34 may vary linearly as the line L1 or non-linearly as the lines L2, L3 so as to generate fading color variation between the light shielding layer 32 and the display area 300 for visual effect.

Figure 4:
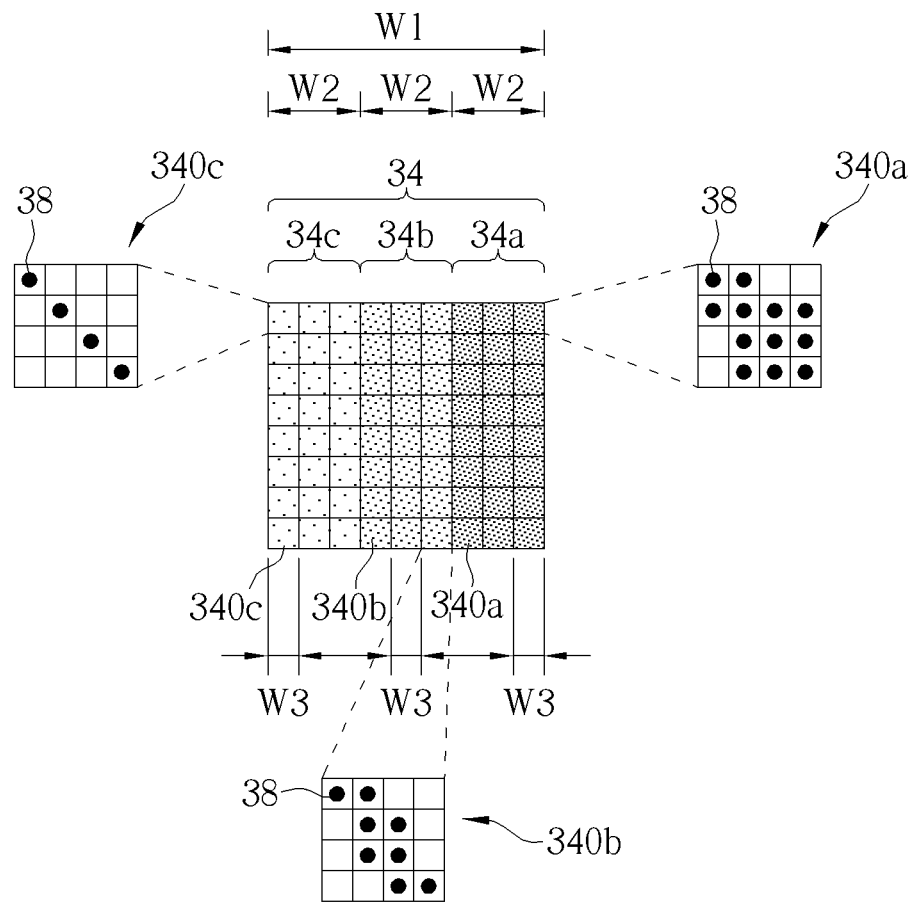
FIG. 4 is a schematic diagram illustrating the light transmissible areas shown in FIG. 2, wherein the light transmissible areas comprise light shielding patterns distributed indifferent area ratios.
Figure 5:
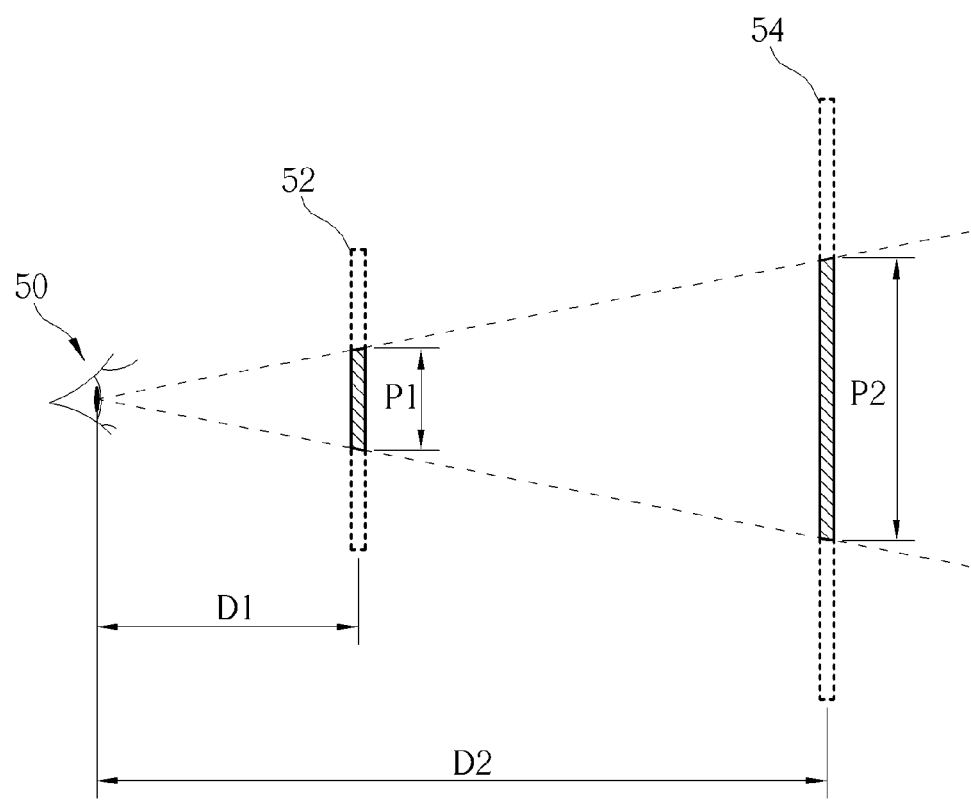
FIG. 5 is a schematic diagram illustrating an eye watching two display devices with different sizes in different distances.

Referring to FIGS. 4 and 5, FIG. 4 is a schematic diagram illustrating the light transmissible areas 34a, 34b, 34c shown in FIG. 2, wherein the light transmissible areas 34a, 34b, 34c comprise light shielding patterns 38 distributed in different area ratios; and FIG. 5 is a schematic diagram illustrating an eye 50 watching two display devices 52, 54 with different sizes in different distances. As shown in FIG. 4, each of the light transmissible areas 34a, 34b, 34c may consist of a plurality of sub-areas 340a, 340b, 340c. In this embodiment, a width W1 of the fading pattern 34 is substantially larger than 1 mm and a width W2 of each light transmissible area 34a, 34b, 34c is substantially larger than 30 μm, such that a user cannot distinguish the color difference between the light transmissible areas 34a, 34b, 34c clearly, so as to generate a visual effect of fading color variation between the light shielding layer 32 and the display area 300.

As shown in FIG. 5, the display device 52 is a small size display device (e.g. 3.5 to 6 inch) and the display device 54 is a large size display device (e.g. 100 to 300 inch). In general, if a distance D1 between the eye 50 and the small size display device 52 is about 20 cm, the eye 50 cannot distinguish two adjacent pixels with a pixel pitch P1 smaller than 30 μm correspondingly; and if a distance D2 between the eye 50 and the large size display device 54 is about 10 m, the eye 50 cannot distinguish two adjacent pixels with a pixel pitch P2 smaller than 2000 μm correspondingly. Therefore, to disable the user from distinguishing the color difference between the light transmissible areas 34a, 34b, 34c clearly, a width W3 of each sub-area 340a, 340b, 340c is substantially larger than or equal to 30 μm and smaller than or equal to 2000 μm.

As shown in FIG. 4, the light transmissible areas 34a, 34b, 34c of the invention comprise light shielding patterns 38 distributed in different area ratios such that the transmittances of the light transmissible areas 34a, 34b, 34c are different from each other. For example, each sub-area 340a of the light transmissible area 34a may comprise 75% light shielding patterns 38 such that the transmittance of the light transmissible area 34a is 25%; each sub-area 340b of the light transmissible area 34b may comprise 50% light shielding patterns 38 such that the transmittance of the light transmissible area 34b is 50%; and each sub-area 340c of the light transmissible area 34c may comprise 25% light shielding patterns 38 such that the transmittance of the light transmissible area 34c is 75%. In this embodiment, the light shielding patterns 38 may be chromium (Cr), chromium oxide, black matrix or other light shielding materials.

Figure 6:
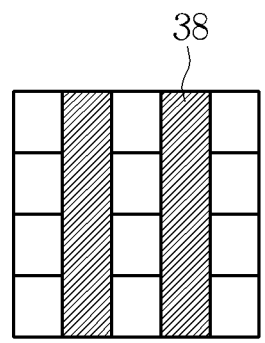
FIG. 6 is a schematic diagram illustrating three different types of light shielding patterns.
Figure 6:
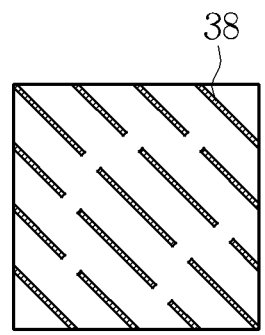
Figure 6:
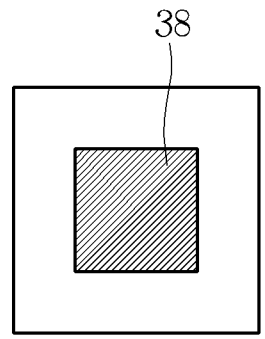

Referring to FIG. 6, FIG. 6 is a schematic diagram illustrating three different types of light shielding patterns 38. The light shielding patterns 38 of the invention may also designed as other types shown in FIG. 6 and are not limited to the embodiment shown in FIG. 4.

Furthermore, except the aforesaid manner, the light transmissible areas 34a, 34b, 34c may also comprise ink or pigment with different transmittances such that the transmittances of the light transmissible areas 34a, 34b, 34c are different from each other. For example, the light transmissible area 34a may be formed by ink or pigment with 25% transmittance, the light transmissible area 34b may be formed by ink or pigment with 50% transmittance, and the light transmissible area 34c may be formed by ink or pigment with 75% transmittance.

Figure 7:
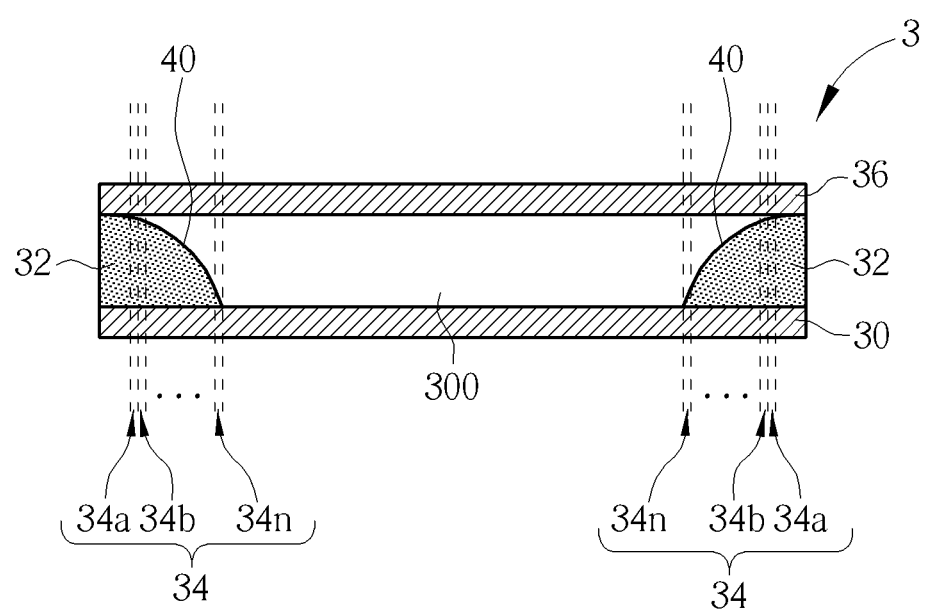
FIG. 7 is a schematic diagram illustrating the light transmissible areas formed by a photo-resist material.

Referring to FIG. 7, FIG. 7 is a schematic diagram illustrating the light transmissible areas 34a, 34b, . . . , 34n formed by a photo-resist material 40. As shown in FIG. 7, the fading pattern 34 comprises a photo-resist material 40 and a thickness of the photo-resist material 40 varies gradually. In this embodiment, the light transmissible areas 34a, 34b, . . . , 34n and the light shielding layer 32 may be formed by the photo-resist material 40. In the photo-lithography process, the exposure of the light transmissible areas 34a, 34b, . . . , 34n can be adjusted by a mask so as to vary the thickness of the photo-resist material 40 within the light transmissible areas 34a, 34b, . . . , 34n gradually and then generate fading color variation between the light transmissible areas 34a, 34b, . . . , 34n.

Figure 8:
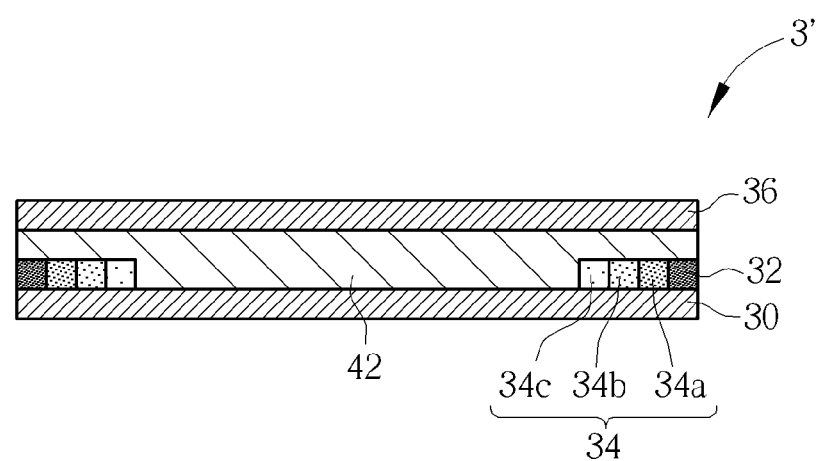
FIG. 8 is a schematic cross-sectional view illustrating a display device according to another embodiment of the invention.

Referring to FIG. 8, FIG. 8 is a schematic cross-sectional view illustrating a display device 3' according to another embodiment of the invention. The main difference between the display device 3' and the aforesaid display device 3 is that the display device 3' further comprises a touch panel 42 disposed between the substrate 30 and the display module 36 and the fading pattern 34 is disposed between the substrate 30 and the touch panel 42, wherein the touch panel 42 may be resistance-type, capacitance-type or other touch panels according to practical applications. In this embodiment, the touch panel 42 may be an in-cell touch panel or an on-cell touch panel according to practical applications. It should be noted that the touch panel 42 shown in FIG. 8 may also be a touch layer formed on the substrate 30 by one glass solution (OGS) technology according to practical applications. In other words, the invention may also be applied to a touch display device except a common display device. Furthermore, the same elements in FIG. 8 and FIG. 2 are represented by the same numerals, so the repeated explanation will not be depicted herein again.

Figure 9:
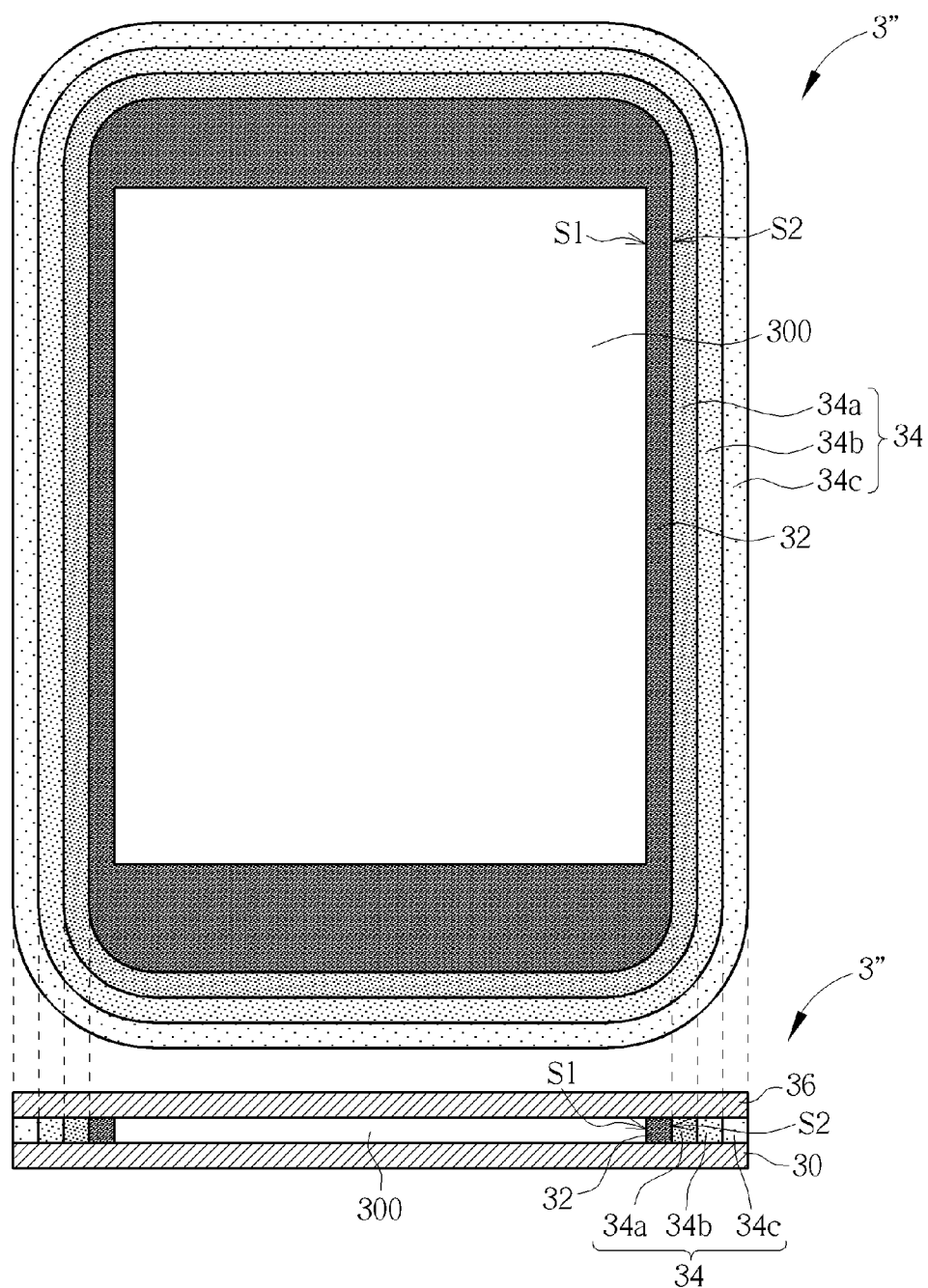
FIG. 9 is a schematic front and cross-sectional view illustrating a display device according to another embodiment of the invention.

Referring to FIG. 9, FIG. 9 is a schematic front and cross-sectional view illustrating a display device 3" according to another embodiment of the invention. The main difference between the display device 3" and the aforesaid display device 3 is that the fading pattern 34 of the display device 3" is located at the second side S2 of the light shielding layer 32. In other words, the fading pattern 34 is located at the outside of the light shielding layer 32 relative to the display area 300. Similarly, the transmittances of the light transmissible areas 34a, 34b, 34c of the fading pattern 34 may increase in a direction away from the light shielding layer 32 (i.e. increase in the direction away from the display area 300) such that the color in the direction from the light shielding layer 32 to the fading pattern 34 generates fading variation. Accordingly, after adding a new light shielding layer (not shown) on the outside of the light shielding layer 32, the invention can utilize the variation of the transmittances of the light transmissible areas 34a, 34b, 34c to eliminate the obvious boundary between the new and original light shielding layers. It should be noted that the same elements in FIG. 9 and FIG. 2 are represented by the same numerals, so the repeated explanation will not be depicted herein again.

Figure 10:
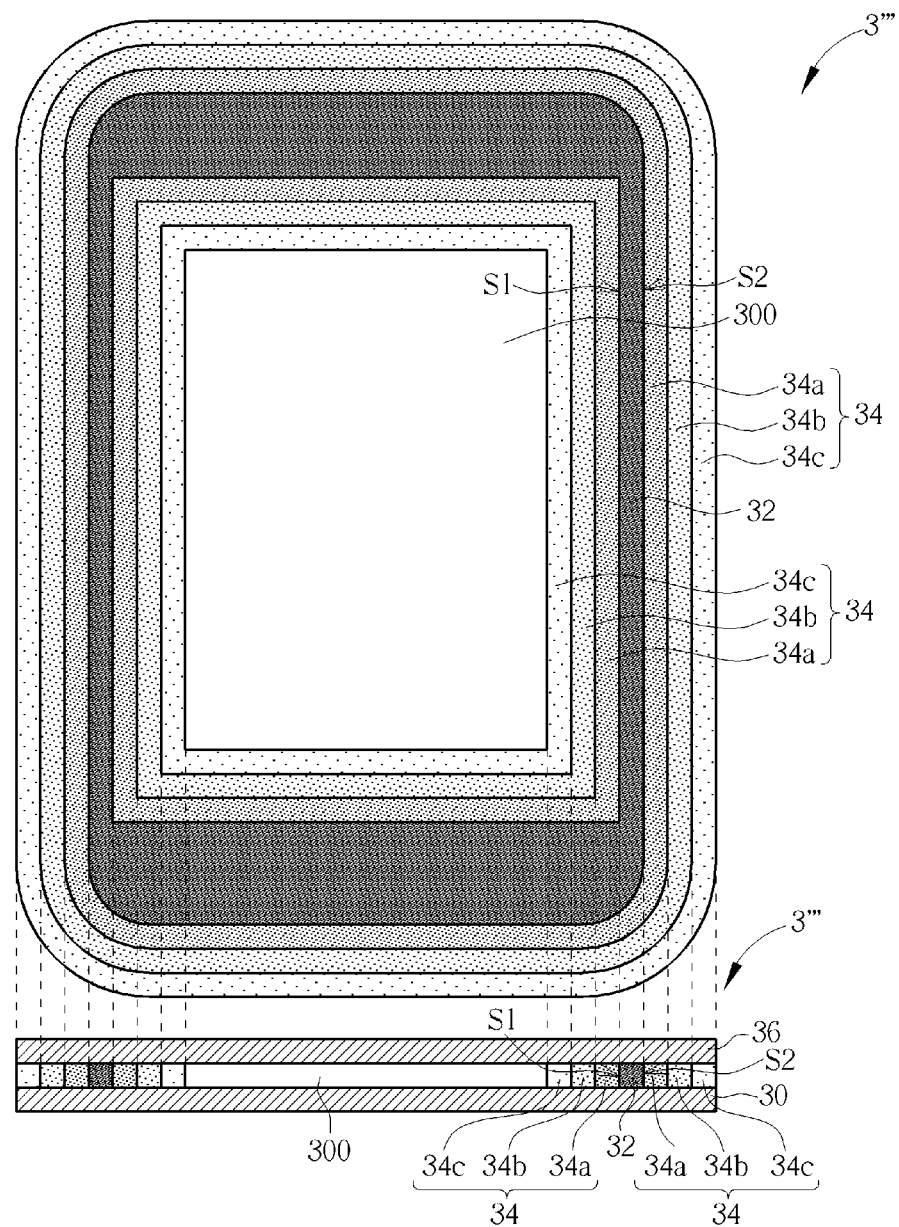
FIG. 10 is a schematic front and cross-sectional view illustrating a display device according to another embodiment of the invention.

Referring to FIG. 10, FIG. 10 is a schematic front and cross-sectional view illustrating a display device 3''' according to another embodiment of the invention. The main difference between the display device 3''' and the aforesaid display device 3 is that the display device 3''' comprises two fading patterns 34 adjacent to the first side S1 and the second side S2 of the light shielding layer 32, respectively. In other words, the invention may dispose the fading patterns 34 at opposite sides of the light shielding layer 32 at the same time so as to eliminate the obvious boundary between the light shielding layer 32 and the display area 300 and eliminate the obvious boundary between the new and original light shielding layers. It should be noted that the same elements in FIG. 10 and FIG. 2 are represented by the same numerals, so the repeated explanation will not be depicted herein again.

Compared with the prior art, the invention disposes the fading pattern at at least one side of opposite sides of the light shielding layer and the fading pattern comprises at least two light transmissible areas with different transmittances. Through the variation of different transmittances, the color in a direction from the light shielding layer to the fading pattern will vary gradually so as to eliminate the obvious boundary between the light shielding layer and the display area and/or eliminate the obvious boundary between the new and original light shielding layers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
    a substrate;
    a display module disposed on the substrate, the display module having a display area;
    a light shielding layer disposed on a periphery of the substrate, the light shielding layer having a first side and a second side, the first side being opposite to the second side; and
    at least one fading pattern disposed on the substrate, adjacent to at least one side of the first side and the second side of the light shielding layer, and not overlapping the display area of the display module, each fading pattern comprising N light transmissible areas, the N light transmissible areas being adjacent to each other, transmittances of the N light transmissible areas being different from each other, wherein N is a positive integer larger than one.

2. The display device of claim 1, wherein a width of the fading pattern is substantially larger than 1 mm.

3. The display device of claim 1, wherein the transmittances of the N light transmissible areas increase gradually in a direction away from the light shielding layer.

4. The display device of claim 1, wherein a width of each light transmissible area is substantially larger than 30 μm.

5. The display device of claim 1, wherein each light transmissible area consists of a plurality of sub-areas and a width of each sub-area is substantially larger than or equal to 30 μm and smaller than or equal to 2000 μm.

6. The display device of claim 1, wherein the fading pattern comprises a photo-resist material and a thickness of the photo-resist material varies gradually.

7. The display device of claim 1, wherein the N light transmissible areas comprise light shielding patterns distributed in different area ratios.

8. The display device of claim 1, wherein the N light transmissible areas comprise ink or pigment with different transmittances.

9. The display device of claim 1, further comprising a touch layer disposed between the substrate and the display module.

10. The display device of claim 1, further comprising a touch panel disposed between the substrate and the display module.

11. The display device of claim 1, wherein the first side of the light shielding layer is close to the display area and the second side of the light shielding layer is far away from the display area correspondingly.

* * * * *